March 26, 1957 R. VAN GAASBEEK ET AL 2,786,576
FILTER
Filed Aug. 24, 1954 8 Sheets-Sheet 1

INVENTOR.
Richard Van Gaasbeek.
Edward A. Seiz
BY
ATTORNEYS.

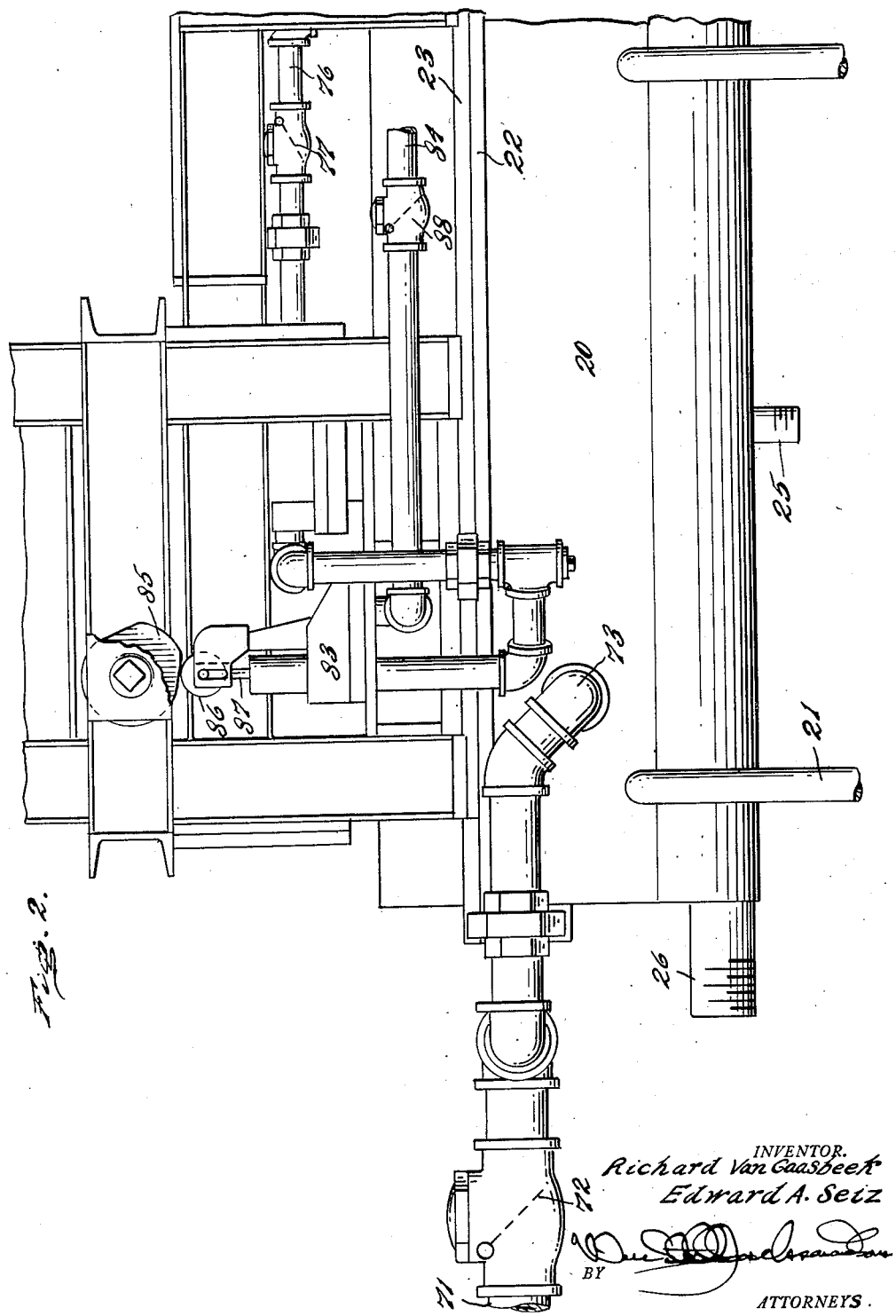

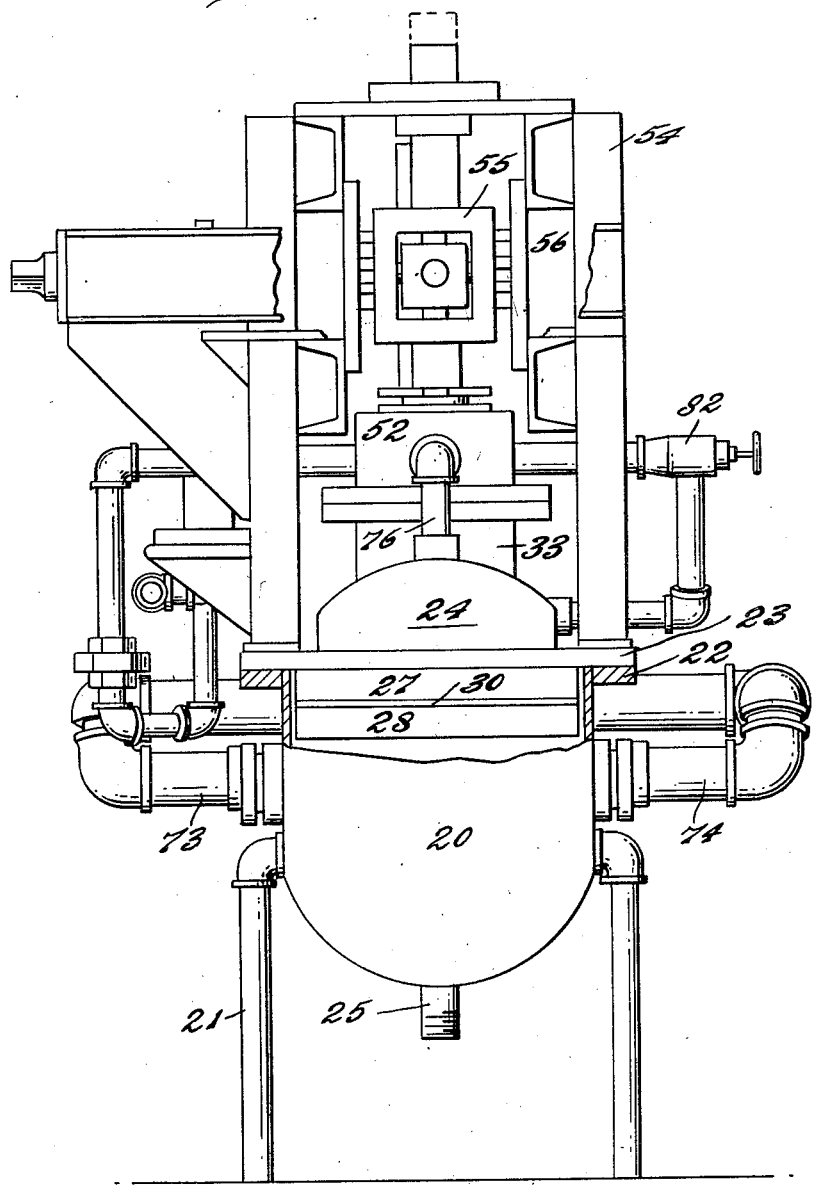

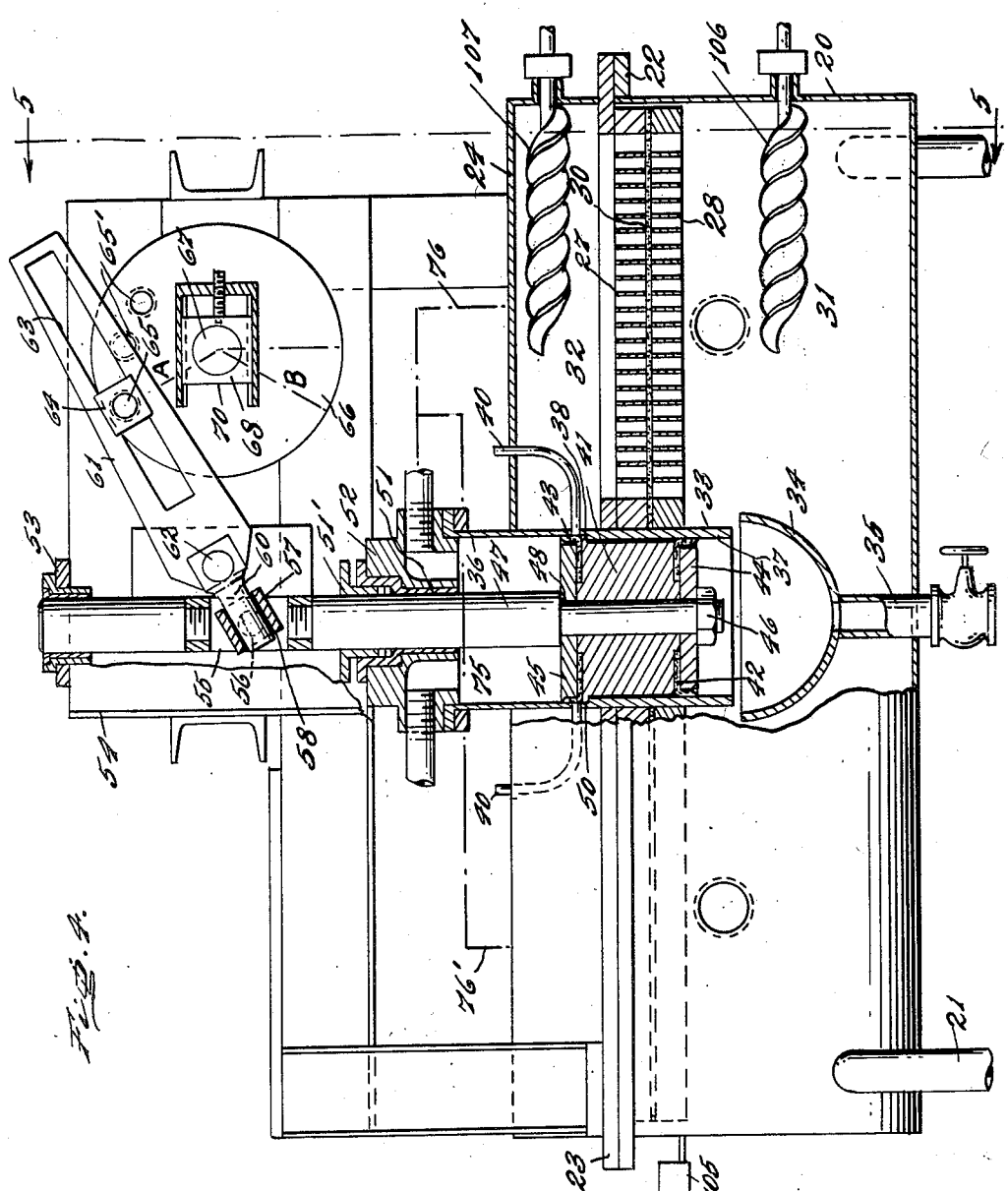

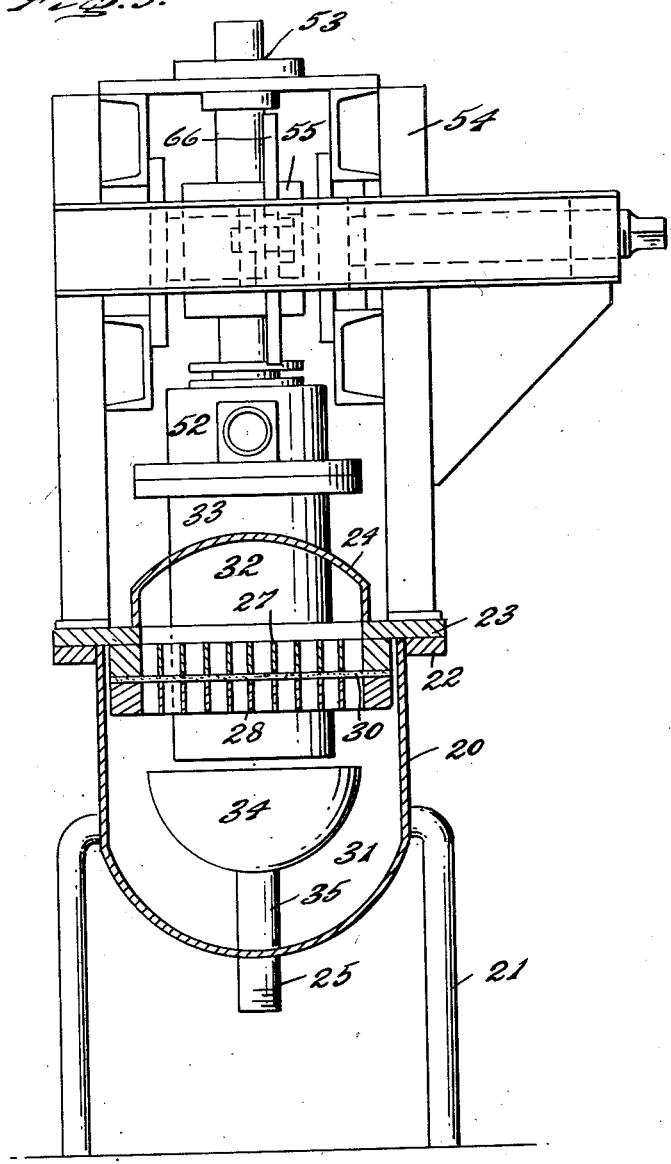

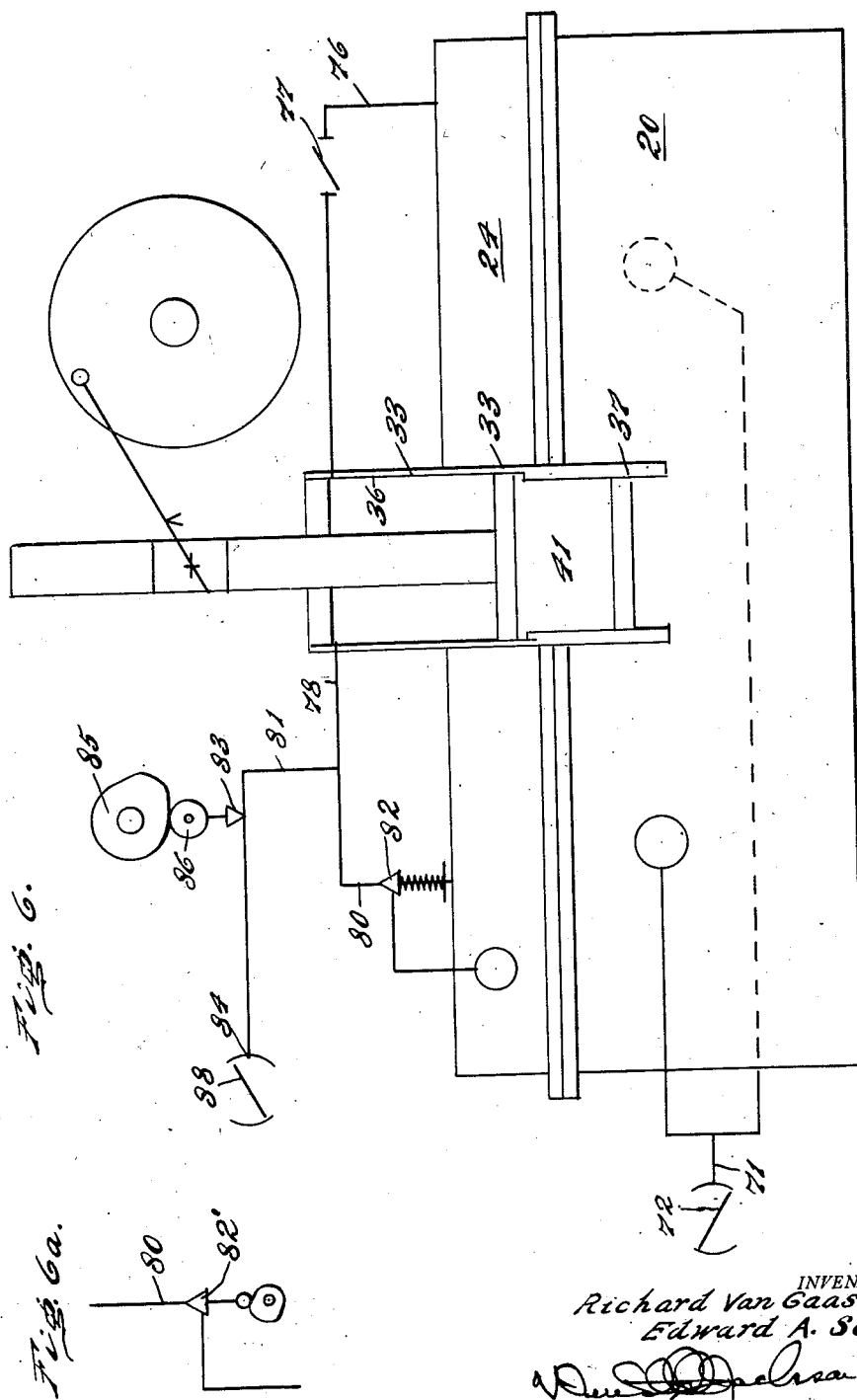

March 26, 1957 R. VAN GAASBEEK ET AL 2,786,576
FILTER
Filed Aug. 24, 1954 8 Sheets-Sheet 7
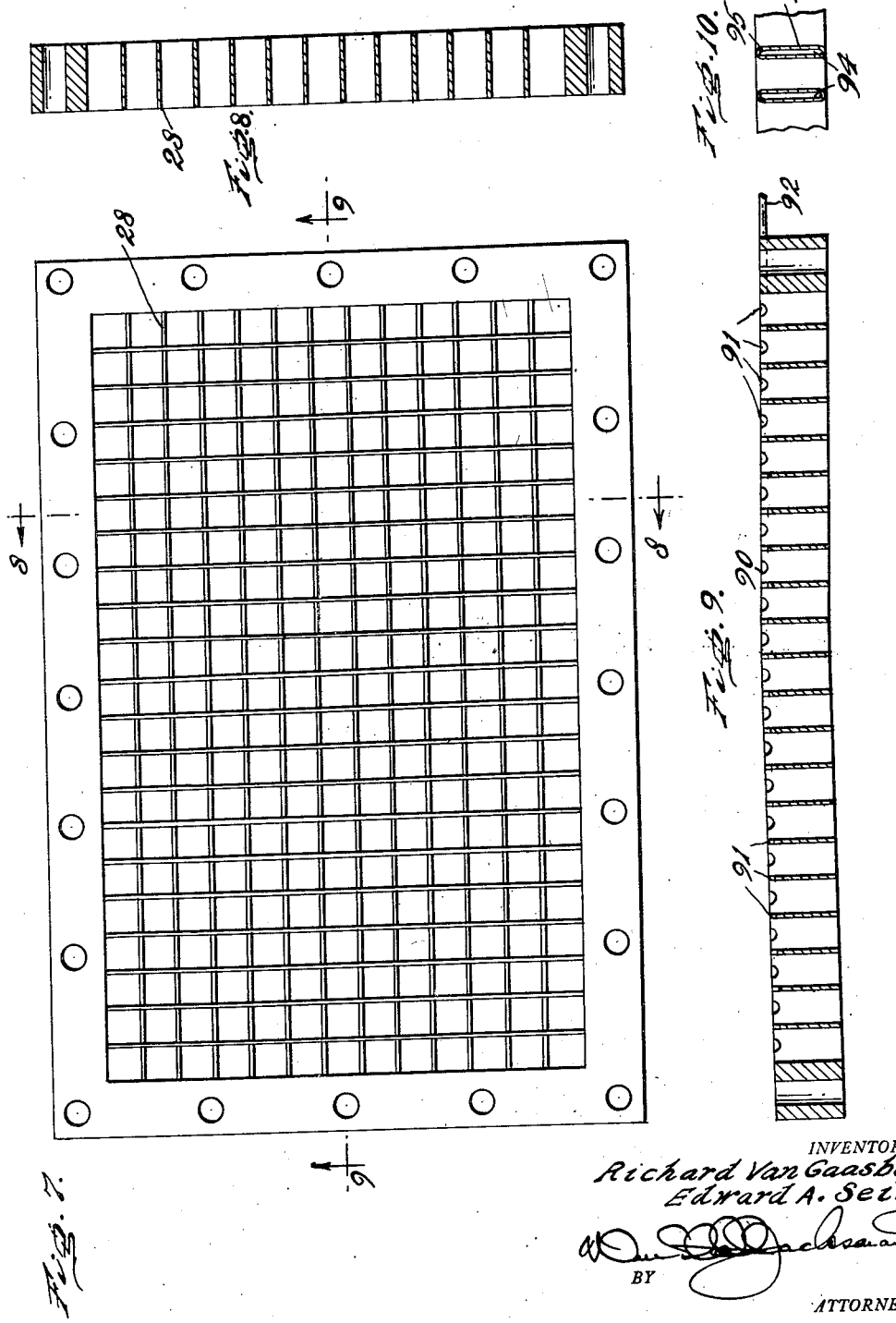
INVENTOR.
Richard Van Gaasbeek
Edward A. Seiz
BY
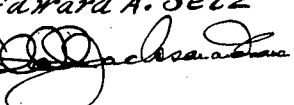
ATTORNEYS March 26, 1957   R. VAN GAASBEEK ET AL   2,786,576
FILTER
Filed Aug. 24, 1954   8 Sheets-Sheet 8
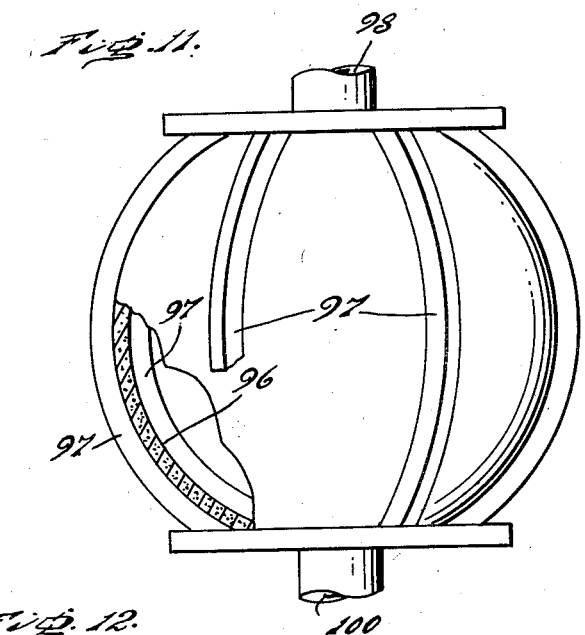
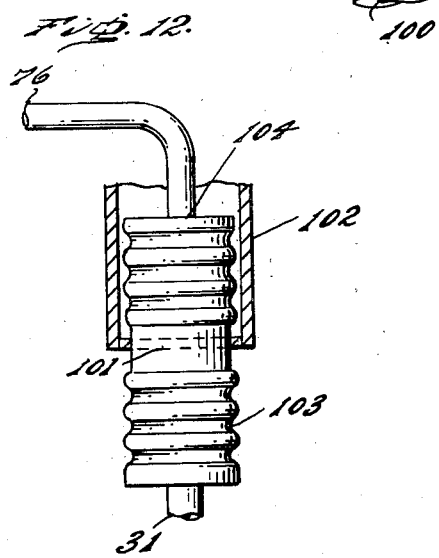
INVENTOR.
Richard Van Gaasbeek
Edward A Seiz
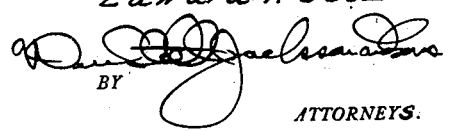
BY
ATTORNEYS.

United States Patent Office 2,786,576
Patented Mar. 26, 1957

2,786,576

FILTER

Richard Van Gaasbeek and Edward A. Seiz, Lansdale, Pa.

Application August 24, 1954, Serial No. 451,762

16 Claims. (Cl. 210—152)

The present invention relates to a combination filter and pump which is also capable of performing extractions and infusions.

A purpose of the invention is to produce a filter having a filter medium, an inlet chamber on one side of the filter medium, a filtrate chamber on the other side of the filter medium, pump means for forcing filtrate through the filter medium from the inlet chamber to the filtrate chamber by positive displacement, pump means on each cycle for backwashing the filter by forcing a lesser quantity from the filtrate chamber through the filter medium to the inlet chamber by positive displacement, pump means operative on each cycle for discharging a portion of the filtrate from the filtrate chamber, and pump means for introducing liquid to an inlet chamber.

A further purpose is to accomplish the various pump functions by a positive displacement pump having an opposed filtering chamber and a backwash chamber, one of which relatively increases and the other of which relatively reduces, as the pump moves back and forth, with a port connecting the inlet chamber with the filtering chamber of the pump, an inlet chamber for introducing liquid to be filtered, a valve in the inlet chamber, at least one passage connecting the filtrate chamber with the backwash chamber and discharge chamber of the pump, valve means in the passage, a discharge connection from the backwash chamber, and a valve in the discharge connection.

A further purpose is to force the filtrate back through the filter medium at a substantially higher pumping velocity than the liquid is forced through the filter medium.

A further purpose is to adjust the relation of the quantity of filtrate forced forward through the filter medium per cycle, to the quantity of filtrate forced back through the filter medium per cycle.

A further purpose is to provide in the valve means between the filtrate chamber and the backwash chamber, a valve opening to admit filtrate to the backwash chamber when the filtrate is going forward through the filter medium and a valve opening to admit filtrate into the filtrate chamber when the pump is forcing filtrate from the backwash chamber.

A further purpose is to provide the same displacement in the pump with the same motion of the piston in the filter chamber, and the backwash chamber.

A further purpose is to provide an inlet connection which enters the inlet chamber adjacent to and below the filter medium.

A further purpose is to provide a baffle between the inlet chamber and the filtering chamber of the pump.

A further purpose is to provide forward pumping and backwash pumping by pump means having the same displacement per unit movement.

A further purpose is to provide the pump with a cylinder having a bore of relatively small diameter forming the filtering chamber, and a bore of larger diameter forming the backwash chamber with piston portions fitting the bore of the two diameters, and moving together with the same displacements in the two chambers.

A further purpose is to vent the space between the two cylinders to atmosphere.

A further purpose is to support the filter medium by ribs.

A further purpose is to prestress or preload the filter medium by supporting ribs to resist the pressure.

A further purpose is to provide grids supporting the filter medium on both sides and preferably also on each side to introduce the liquid to be filtered through multiple openings extending longitudinally through the ribs of the grids.

A further purpose is to provide tubular ribs through which the liquid to be filtered enters, and to discharge the liquid through the ribs adjoining the filter medium.

A further purpose is to make the filter medium of generally spherical formation to resist pressure.

A further purpose is to provide a pivoted lever to operate the piston by pivotal connection at one end of the lever, and to employ a crank engaging a guideway at the other end of the lever to manipulate the lever.

A further purpose is to advance the pump means to constrict the filtering chamber and increase the volume of the backwash chamber, while maintaining the inlet valve and the outlet valve closed, and allowing flow through a passage from the filtrate chamber to the backwash chamber to force the filtrate through the filter medium and into the backwash chamber, then to retract the pump means to decrease the size of the backwash chamber and increase the filtering chamber while maintaining the inlet and the outlet valve closed and allowing flow through a passage chamber to the filtrate chamber and thus forcing a position of the filtrate back through the filter medium, and then while the pump means is still increasing the size of the filter chamber and constricting the size of the backwash chamber to close off the valve means between the backwash chamber and the filter chamber and thereby stop backwash and open the inlet valve and the outlet valve to discharge filtrate to the outlet and bring in a new charge to be filtered.

A further purpose is to maintain a pressure on the outflow side of the filtering medium which is zero or negative during both filtering and backwashing.

A further purpose is to dislodge particles by the backwash and permit them to separate out by gravity or buoyancy during the remainder of the discharge stroke of the pump.

A further purpose is to form an extract from a base material such as coffee, tea, chemicals or the like by introducing the base material with the liquid which is to carry the extract, and filtering the liquid from the solid while forming the extract, suitably at an elevated temperature, according to the procedure previously described.

Figure 2 is a front elevation of Figure 1.

Figure 3 is a right side elevation of Figure 1, partly broken away.

Figure 4 is a section of Figure 1 on the line 4—4 to enlarged scale.

Figure 5 is a section on the line 5—5 of Figure 4.

Figure 6 is a diagram showing the hydraulic connections.

Figure 6a is a fragment of Figure 6 showing a cam operated valve 82'.

Figure 7 is a detailed plan view showing one of the supporting grids for the filter medium.

Figure 8 is a section on the line 8—8 of Figure 7.

Figure 9 is a section showing a variation of the filter grid, corresponding in position to a section on the line 9—9 of Figure 7.

Figure 10 is a view corresponding to fragmentary transverse section of Figure 7 on the line 9—9 and showing tubular grids with openings to provide contact with the under side of the filter medium.

Figure 11 is a side elevation showing a generally spherical type of filter medium with external ribs for support.

Figure 12 is a diagram showing a bellows type of pump with an operating member on the outside.

Figure 1:
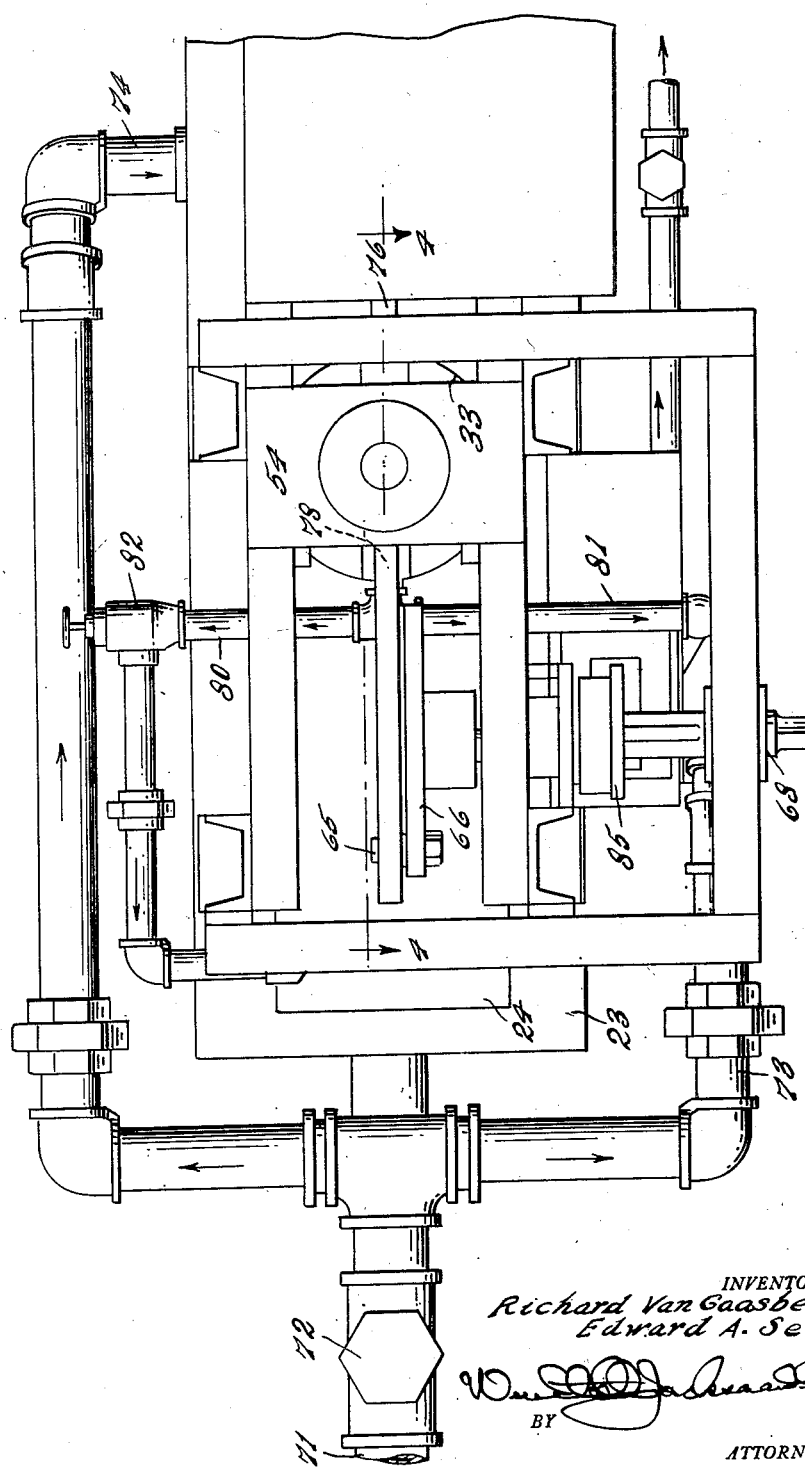
Figure 1 is a fragmentary plan view of the device of the invention.

In the prior art filters have commonly employed a series of plates covered with filter medium and arranged or stacked in sequence, for example, a press, through which the liquid to be filtered is passed. This arrangement has been subject to the difficulty that the filter periodically clogs and the back pressure increases during operation, with corresponding reduction of the rate of filtration. It is eventually necessary in most cases to disassemble the mechanism in order to remove a filter cake.

In some cases, in very large filters such as sand filters for water and the like, the filter is operated for an extended period until it ceases to give good service, and then is taken from service and backwashed by forcing water or other liquid through the filter medium in the reverse direction and removing accumulated dirt and the like. This type of operation, however, is limited in its applicability and is subject to the disadvantage that the filter is periodically taken out of service for an extended period.

The present invention is concerned with the production of filters which will operate for very extended periods of time without clogging, and will continuously separate the filter cake from the filter medium and remove it from the filter.

The invention is applicable particularly to filter media which are relatively permanent although it can also employ sand or other media of less permanent character. The device of the invention is a combined filter and pump, which has an inlet chamber on one side of the filter medium, a filtrate chamber on the other side of the filter medium and pump means for forcing filtrate through the filter medium from the inlet chamber to the filtrate chamber by positive displacement, pump means operative on each cycle for forcing a lesser quantity of filtrate from the filtrate chamber through the filter medium back to the inlet chamber by positive displacement, pump means operative on each cycle for discharging a portion of the filtrate from the filtrate chamber, and pump means for introducing liquid to be filtered into the inlet chamber. The invention suitably employs a positive displacement pump having an opposed filtering chamber and backwash chamber, one of which relatively increases and the other of which relatively reduces as the pump moves back and forth with a port connecting the inlet chamber with the filtering chamber on the pump, an inlet connection for introducing liquid to be filtered to the inlet chamber, a valve in the inlet connection, at least one passage connecting the filtrate chamber with the backwash chamber of the pump, valve means in the passage, a discharge connection from the backwash chamber and a valve in the discharge connection.

In the preferred embodiment of the device, the pump forces the filtrate back through the filter medium at a substantially higher pump velocity than the pump forces the filtrate forward through the filter medium. The device is adjustable to control the quantity of filtrate forced forward through the filter medium per cycle and also to adjust the relation of the quantity of filtrate forced forward through the filter medium per cycle to the quantity of filtrate forced back through the filter medium per cycle.

Provision is desirably made in the valve means between the filtrate chamber and the backwash chamber of a valve opening to admit filtrate to the backwash chamber when the filtrate is flowing forward through the filter medium and also a valve to admit filtrate into the filtrate chamber when the pump is forcing filtrate from the backwash chamber.

The preferred pump construction also has the same displacement with the same motion in the filtering chamber and in the backwash chamber.

The inlet connection desirably enters the inlet chamber adjacent to and below the filter medium, and a baffle is desirably provided between the inlet chamber and the filtering chamber of the pump.

In the best form the pump has a cylinder having a bore of small diameter comprising the filtering chamber and a bore of larger diameter comprising the backwash chamber, and pistons fitting the bores of the two diameters and moving together with the same displacement. The space between the two cylinders is desirably connected to atmosphere.

In a preferred form of the invention, the filter medium is supported on opposite sides by the ribs of a grid, and the ribs are desirably preloaded or prestressed to exert a load on the filter medium which increases as the distance away from the support increases and resists the pressure. The ribs may be used without prestressing when desired. The inlet is preferably along one side of the filter medium, suitably through multiple tubes, and desirably along notches in the ribs. In one embodiment the ribs will always circulate the incoming liquid to be filtered through openings adjoining the filter medium.

In some cases the filter medium is of generally spherical shape to resist the pressure.

The operating mechanism desirably consists of a lever pivoted between its ends, pivotally connected to the piston at one end of the lever and having a guideway at the other end which is engaged by a crank.

During normal operation, the pump advances to constrict the filtering chamber and increase the size of the backwash chamber while maintaining the inlet valve and the outlet valve closed, and allowing flow through a passage from the filtrate chamber to the backwash chamber to force filtrate through the filtering medium and into the backwash chamber, then the pump is retracted to decrease the size of the backwash chamber and increase the size of the filtering chamber while maintaining the inlet valve and the outlet valve closed and allowing flow through a passage from the backwash chamber to the filtering chamber and to force a portion of the filtrate back through the filter medium, and then, while the pump is still increasing the size of the filtering chamber and constricting the size of the backwash chamber, the valve between the backwash chamber and the filtrate chamber is closed, thereby stopping backwash and the inlet valve is opened to bring in a new charge to be filtered, and the outlet valve is opened to discharge filtrate. During this operation, the pressure at the face of the filtering medium adjoining the charge to be filtered is zero or negative during backwash.

The structure permits particles dislodged during backwash to drop from the lower side of the filtering medium and separate out by gravity or buoyancy during the remainder of the stroke of the pump until the beginning of filtering on the next stroke.

As later explained more in detail, the invention is not limited to filtering alone, but can perform extractions and infusions, bringing in a solid material such as coffee or tea along with a liquid such as water and at a suitable temperature, desirably at elevated temperature, to remove an essence from the solid material and distribute it in the liquid while at the same time filtering to separate the solid from the liquid. The fact that both the forward filtering and the backwash are accomplished under positive pressure makes it possible to operate near the boiling point of the liquid and to employ volatile solvents.

Considering now the preferred mechanism by way of example and not limitation, the combined filter and pump mechanism of the invention comprises a tank 20 which is conveniently supported on a frame comprising legs 21, and having a top flange 22 which is removably connected as by bolts or the like to a bottom flange 23 of a cover 24. It will of course be evident that the joint between the flanges 22 and 23 will be suitably gasketed as desired.

The tank 20 is desirably provided with a sample opening 25 and a drain-out opening 26, each controlled by a suitable valve.

The flange 23 of the cover removably supports in horizontal position an upper combined grid and frame 27, a lower combined grid and frame 28 and an intermediate filtering medium 30. The combined grids and frames at the edges are suitably bolted together and through the filter medium to secure them removably to the flange 23 so that when the cover is taken off the filter medium will be removed.

In the broad aspects of the invention, the character of the filter medium is not critical and any suitable filter medium may be used. It is, however, desirable to use a porous sintered powder metal filter medium of the type for example of porous stainless steel, porous bronze, porous brass, porous aluminum alloy, or any other suitable porous material. Where the character of the liquid is such that it is not corrosive to a particular filter medium, a wider selection of filter media may be permitted, and in some cases porous plain carbon steel, porous iron, or porous alloys of powdered iron with minor quantities of such ingredients as copper and nickel, may be used. The porosity may vary from a fraction of 1% to 30% or more by volume. In some cases porous refractory, porous plastic, porous rubber or synthetic rubber, wire mesh, fabric or paper may be used as a filter medium.

The effect of the construction is to separate the interior of the tank into a lower inlet chamber 31 which is in communication from end to end, and an upper outlet chamber 32 which likewise is in communication from end to end, the two chambers, however, having no direct communication except through the filter medium and through the pump mechanism to be described.

It will again be appreciated that any one of a wide variety of pumping mechanisms may be employed in the broader aspects of the invention to cooperate with the filter, although a particular preferred embodiment of pump is illustrated, along with certain alternate features.

Mounted between the two filtering units seen at the left and right in Figure 4 is a pump cylinder 33 which at its end adjoining the inlet chamber communicates with the inlet chamber, but is protected from direct ingress of particles removed by previous filtration by means of a bowl-shaped baffle 34 which is conveniently supported on pipe leg 35 which is part of sample pipe 25. The purpose of the baffle 34 is to divert flow up toward the lower surface of the filter media rather than down against the previously filtered particles so that there will not be a tendency to disturb relatively quiescent settled material which is in the bottom of the tank, as the pump operates. Thus, the outlet between the baffle and the cylinder is upwardly directed.

The cylinder 33 has an upper cylinder portion of relatively larger internal diameter at 36 and a lower cylinder portion of relatively smaller internal diameter at 37 connected by an internal shoulder 38. The space adjoining the shoulder is desirably vented by tubes 40 which extend to atmosphere and permit observation of any leakage of the packing, and also avoid the possibility of compressing and expanding air in this space as the pump operates.

The cylinder (Figure 4) is fitted with a piston 41 which is stepped to fit the two bores of the cylinder, and is provided with a packing 42 for the smaller cylinder bore and a packing 43 for the larger cylinder bore with packing backing plates 44 and 45 which are tightened by nut 46 on piston rods 47, the nut acting against shoulder 48. The packing of the larger diameter is supported on the side opposite to the backing plate 45 by a shoulder 50 on the piston.

It will be understood that the invention does not contemplate restriction to any one mechanism for operating the piston, although a preferred embodiment of a suitable mechanism is shown. The piston rod is guided by a guide bearing 51 in cylinder head 52, united to the cylinder by suitable flanges and bolts, and also by a guide bearing 53 at the outboard end which is mounted in frame 54 supported on the flange 23. A packing gland is provided at 51' to support packing for the cylinder.

Between the two ends the piston rod is provided with a yoke 55 which mounts transverse trunnion bearings 56 which mount a trunnion 57 supporting a sliding bearing 58 which provides pivotal and slidable bearing engagement for end 60 of rocking lever 61 which has fixed pivotal support at 62 on the frame.

The rocking lever has a longitudinal guideway 63 which guides a crank block 64 which makes pivotal engagement with a crank pin 65 on a crank plate 66 mounted on main shaft 67 which is journalled in bearings 68 in the frame.

It will be evident that in some embodiments of the invention it is desirable to vary the throw of the rocking lever and therefore vary the rate of backwash, and this can be done by adjusting the position of the bearings 68 with respect to the pivot 62 by adjustment 70 (Figure 4).

The inlet of the liquid to be filtered is provided through pipe 71 and check valve 72 which opens in the direction of inlet flow, and then through branch pipe 73 which connects the inlet chamber immediately beneath and across the bottom of one filter medium, and also through branch pipe 74 which similarly connects beneath and to direct flow immediately across the bottom to the other filter medium at the opposite end.

The outlet chamber 32 is connected with the space 75 on the side of the piston remote from the inlet chamber by means of pipe 76 (or permissibly several branch pipes 76 and 76', Figure 4) and check valve 77 which opens in the direction of flow into the cylinder space 75. The cylinder space 75 also connects by pipe 78 to two branch pipes 80 and 81.

Pipe 80 connects to backwash control valve 82 and then enters the outlet chamber. In the preferred embodiment this is being shown as a spring loaded valve which is biased toward closing and opens when the pressure of the liquid in cylinder space 75 reaches a predetermined value. It will, however, be evident that where desired this may be a cam controlled valve and an alternate fragment showing a cam operated valve 82' is illustrated in Figure 6a.

Pipe 81 passes through discharge valve 83 to the discharge 84 from the combined pump and filter. It will be evident that in the preferred embodiment the discharge valve 83 is cam controlled, but it will of course be evident also that any other desired manner of controlling this valve may be used.

In the cam control of valve 83 cam 85 on the main shaft is engaged by follower roller 86 which is rotatably mounted on plunger 87 of the valve 83, the follower being spring biased toward the cam. The outlet is also provided with a check valve 88 which opens in the direction of outlet flow.

It will be evident that the quantity of liquid which is pumped and used in backwash per stroke can be varied by the alternate crank positions 65' which are shown around the crank plate, permitting the use of various crank arms.

It will be evident that in some cases it will be advantageous to preload the grid support of the filter medium so as to limit or prevent deflection with the change in pumping action. In Figure 9 I illustrate a longitudinal section through a grid which is cambered at 90 on both longitudinal and transverse grid elements according to a suitable radius. When the two grid elements are clamped together, with the convex cambered sides engaging the filter medium, there is thus provided preloading on the filter medium and the magnitude of preloading increases according to a desired law from the outside edge where it can decrease to zero to a maximum at the middle. The preloading may be equal to the deflection load or it may be desirably somewhat greater than the deflection load.

In order to permit adequate flow through the filter medium at points adjoining the grid, the grid may be notched at 91 on the face adjoining the filter medium and permissibly on the longitudinal or the transverse elements or both as shown so as to facilitate both access of filter liquid for initial filtration and also particularly to permit dislodgment of particles which might accumulate when the backwash occurs. In this case it is desirable to feed through pipes 92 which are directed along the face of the filter medium so as to permit flow through the notches.

In some cases it is desirable to use tubular ribs 93 for the grid elements or for one set of grid elements as shown in Figure 10, and in this case the inlet can desirably be provided so that the solution to be filtered will flow through the interior of the grid elements at 94, and will distribute to the filter medium through openings 95 distributed along the tubular grid elements on the side engaging the filter medium.

It will also be evident that any desired shape of the filter medium may be employed and it will not necessarily be flat. For example, in Figure 11 I illustrate a generally spherical construction of filter medium 96, which is braced by suitably meridian ribs 97 on the outside or inside or both as desired, with flow of filter liquid preferably from the outside to the inside and backwash from the inside to the outside. The discharge of filtrate is through openings 98 and the drain of the interior is through opening 100.

It will be evident, of course, that the invention is applicable to pumps of the diaphragm and bellows type as well as to pumps of the cylinder and piston type. Figure 12 illustrates such a construction, in which an operating plate 101 is manipulated back and forth by an operating rod 102, to move back and forth opposed bellows 103 and 104, one of which is connected to the inlet space 31 and the other of which is connected to the pipe 76.

In operation, starting the filtering stroke with the piston fully raised or fully retracted, as the piston moves down, the liquid tending to discharge from the inlet chamber 31 closes inlet check valve 72.

As the piston continues to advance, it forces the filtrate through both units of filter medium under positive displacement pressure. This is a very important aspect of the invention, as applicant does not rely on suction to pass the filtrate through the filter medium, but employs positive pressure, and therefore there is no tendency to form gas pockets in the case of volatile solvents, and there is no difficulty but in fact many times an advantage in heating the material prior to filtration so as to reduce the viscosity and obtain temperature conditions which are most favorable to the result. If it were not for this feature of positive pressure the application of the invention would be very limited in cases where there are volatile solvents, or in cases where the material to be filtered under conditions of ordinary temperature would resemble a viscous mass, a sludge, a gelatinous fluid, or a jelly or taffy. This advantage of accomplishing the filtering under positive pressure and particularly at elevated temperature is especially pronounced in the filtering of food materials, and also in the filtering of organic chemical products.

Filtrate which passes through the filter medium enters the outlet or filtrate chamber 32, and passes through pipe 76 forcing open check valve 77 and entering the cylinder space 75. An important feature of the invention is that with each increment of motion of the piston, the volume displaced by the piston on the inlet chamber side exactly equals the volume displaced by the piston on the outlet chamber side or the side which is connected to the pipe 76, and therefore there is no tendency to create a condition of increased pressure which would tend to oppose keeping of the filter medium clear. This also means that the horsepower required for operation of the piston is retained at a minimum.

It will be evident that during the displacement of liquid from the outlet chamber into the space 75 above the piston there is no development of any elevated pressure which could open the valve 82, therefore the valve 82 remains closed. It will also be evident that the cam retains the valve 83 closed during this downward or filtering stroke.

It should be noted also that the valve 83 tends to close under the pressure of the liquid so that any pressure which might be developed only tends to hold the valve closed. It is also to be remembered that the valve is spring loaded toward closure, and the cam exerts an opening action at the appropriate time.

During the backwash and discharge stroke, as the piston begins to move up, the pressure of the liquid closes check valve 77 and opens backwash valve 82, so that backwash liquid in a desired proportion to the total quantity of liquid filtered is coughed or sneezed back through pipe 80 into the outlet chamber and through the filter medium to the opposite side of the filter, where it acts to dislodge and displace any accumulations of filter cake or agglomerates of filtered solid material which might be on the lower side of the filter medium. It will also be evident that the sweep of the unfiltered product tends further to dislodge this solid material on the lower side of the filter medium and give it an opportunity to settle under gravity.

The valve 83 toward discharge still remains closed. A very important aspect of the invention is that there is positive pressure backwashing, so that again the existence of volatile solvents or other liquids having a tendency to vaporize, at elevated temperatures can have no disadvantageous effect on backwashing. It will further be evident that the backwash is a normal part of every cycle, so that there is no appreciable time allowed for accumulation of deposit on the filter medium between backwashes.

It will furthermore be evident that again during backwashing as the piston moves up, there is space made available on the lower side of the piston to equal the displacement on the upper side of the piston and therefore there is not any build-up of pressure which could be objectionable either from the standpoint of the work done in pumping, or from the standpoint of tendency to pack material in the filter.

A further important aspect of the invention is that the filtering stroke is relatively slow and quiet while the backwash and discharge stroke is relatively rapid. The filtering stroke is accomplished over the angle from B to A counterclockwise as shown on Figure 4, while the backwash and discharge stroke will be over the angle from A to B counterclockwise. As the angle from B to A counterclockwise is 240° and that from A to B counterclockwise is 120°, it will be evident that the motion during the backwash stroke and the velocity of liquid flow are twice as great as that during the filter stroke and the cough or sneeze involves not only a return of liquid but a very rapid impact character of flow which is very effective to dislodge any accumulation.

At any desired point after a certain proportion of the total liquid of the cycle has been used in backwash, for example 25% or 33% or any other desired proportion, the cam opens valve 83 to discharge, and valve 82 closes under its spring loading or is separately closed by a cam as desired. At this point, the discharge liquid passes from the mechanism through check valve 88, it being understood that the pressure against which the pump is acting is less than the pressure under which spring loaded valve 82 can close if a spring loaded valve is employed.

As soon as valve 82 closes, and the flow of backwash liquid ceases, a lessened pressure develops in the inlet chamber, and inlet of a new charge of unfiltered liquid occurs through valve 72 to begin the next cycle.

The filter cake collects in the bottom of the inlet chamber which is relatively quiescent. Any desired means may be used to remove the filter cake, for example a reduced pitch helix conveyor may operate to feed it through to extrude a continuously formed liquid impervious plug through the opening 26, as well known in the art.

It will be evident of course, that any desired means for controlling the interval between removal of the filter cake can be employed, one suitable mechanism being a pressure switch 105 which is responsive to the difference in pressure between the inlet chamber and the outlet chamber, and which extracts the filter cake when a predetermined pressure difference is built up.

It will be evident that in the operation of the device, both the filtration and the backwash are under positive pressure. The backwash has been described as a cough or a sneeze because of the fact that it involves a higher pressure than the filtration and a squirting action through the filter. On the other hand, it should also be noted that the feature of having equal displacement by the pump on the two sides, prevents the development of back pressure on either the filtration or the backwash merely by virtue of the transfer of liquid by the pump. Thus it can properly be said that the backwash is conducted under effectively zero pressure or a slightly negative pressure.

A further important aspect of the invention is that all of the other operations of the device tend to assist the backwash in securing sedimentation of filter cake particles which are dislodged from the filter medium. Thus during the period when liquid is discharging from the pump after the backwash is completed, the inlet chamber is subject to inflow of unfiltered liquid, and this unfiltered liquid is desirably brought in adjacent to and across the bottom of the filter medium, so as to assist in dislodging particles of filter cake. There is a relatively quiescent period in the inlet chamber at this time, and therefore there is a settling out or sedimentation of filter cake particles.

It will be evident of course that the pore size or overall porosity of the filter medium will be adjusted to suit the particular service. Good results are obtained for filtering many liquids of the character for example of coffee, paint, oils, chemicals, beverages, soups, and the like by using an average pore size of approximately 0.0002 inch, and a flow rate of approximately 7 gallons per square foot of filter medium surface with a 5 pound per square inch pressure differential. It will, however, of course be understood that larger and smaller average pore sizes may be used. Average pore sizes as large as 0.0008 inch have been used with success.

It will be evident that the invention may be applied in various different ways. For example it may be used as a filter simply to separate the filtrate from the solid material. It also may be used as an infuser, or an extractor, with a view of separating the solid from the liquid and also of removing from the solid an ingredient which is carried with the liquid.

In filtering it is usually desired to have a quiescent condition in the material to be filtered and in the filtrate. When using the device as an infuser or extractor, stirrers 106 and 107 are available to stir the material to be filtered and the filtrate as desired. The device also has some aspects of a pump, since it will distribute the liquid under a desired pressure head. In some instances the device of the invention may be used to perform a mixing function, as for example where a solid and a liquid are to be brought together in intimate admixture and one dissolved in the other, as for example in the mixing of zinc chromate with acetone.

Suitable extractions which can be performed in the device are the preparation of coffee, tea, vanilla, spice extracts, root beer and other soft drinks, which are produced in liquid form and filtered at the same time. Usually the liquid is water as in the case of coffee or tea.

It will be evident that various adjustments may be employed as already described, for example adjusting the distance from the crank center to the lever arm pivot, adjusting the crank arm, or adjusting the cam so as to determine a variant position at which backwash ceases and discharge begins.

It also will be evident that the thickness of the filter medium may be varied if desired.

It will of course be evident that the provision of vents in the space between the opposite ends of the piston assures that the piston can move freely back and forth.

In cases where attack on packings is likely to be expected, where liquids are abrasive, or where leakage at a packing would be very harmful, it will be understood that the bellows or diaphragm type of pump can be used as shown in Figure 12, to accomplish the purpose.

It will also be evident of course that if the particular material being filtered is of a character where the solids are lighter than the liquid rather than heavier as has been previously assumed, the device can be inverted so that the solids will float out in the inlet chamber instead of sedimenting.

As already explained, the reenforcing of the filter medium can be employed in such a way as to give any desired preloading of the filter medium, and also so as to direct the liquid to be filtered in the most advantageous way along the surface of the filter medium. It will also be understood as already explained that any suitable contour of the filter medium may be employed, which will be most desirable to give the most favorable distribution of stress.

Every effort should be used to maintain the portion of the inlet chamber which contains the separated filter cake in a quiescent condition, and one of the great advantages of the invention in this respect is the feature of having the pump displace equal volumes on opposite sides so that it will not create a pressure condition which would tend to disturb the sedimentation.

Any suitable means of controlling the temperature of the tank 20, whether for heating or cooling, may be employed, and the jacketing or other means can in addition carry suitable heat insulation to minimize the heat transfer through the wall.

It will be evident that if the filter medium should, notwithstanding the precautions taken, tend to clog or fill up with solid material, it can be cleaned out, either by using acid or other solvent to remove the solids filling the pores, by burning out the solids, or otherwise suitably removing them.

Thus the filter medium can be reused and regenerated under conditions suitable to the particular medium and the particular conditions of use.

The speed of operation will vary, usually between 1 and 1000 cycles per minute being a suitable operating rate.

In view of our invention and disclosure variations and modifications to meet individual whim or particular need will doubtless become evident to others skilled in the art, to obtain all or part of the benefits of our invention without copying the process and apparatus shown, and we therefore, claim all such insofar as they fall within the reasonable spirit and scope of our claims.

Having thus described our invention what we claim as new and desire to secure by Letters Patent is:

1. A filter having a filter medium, an inlet chamber on one side of the filter medium, a filtrate chamber on the other side of the filter medium, a positive displacement pump having an opposed filtering chamber and backwash chamber, one of which relatively increases and the other of which relatively reduces as the pump moves back and forth, a port connecting the inlet chamber with the filtering chamber of the pump, an inlet connection for introducing liquid to be filtered to the inlet chamber, a valve in the inlet connection, at least one passage connecting the filtrate chamber with the backwash chamber of the pump, valve means in the passage, a discharge connection from the backwash chamber and a valve in the discharge connection.

2. A filter according to claim 1, in which the valve means between the filtrate chamber and the back-wash chamber includes a valve opening to admit filtrate to the backwash chamber when filtrate is flowing forward through the filter medium and a valve opening to admit filtrate into the filtrate chamber when the pump is forcing filtrate from the backwash chamber.

3. A filter according to claim 2, in combination with means to advance the pump more quickly in the direction to constrict the backwash chamber than in the direction to expand the backwash chamber.

4. A filter according to claim 2, in which the pump has the same displacement with the same motion in the filtering chamber and in the backwash chamber.

5. A filter according to claim 2, in which the inlet connection enters the inlet chamber adjacent to and below the filter medium.

6. A filter according to claim 1, in combination with a baffle between the inlet chamber and the filtering chamber of the pump.

7. A filter according to claim 1, in combination with means to adjust the quantity of filtrate forced forward through the filter medium per cycle.

8. A filter according to claim 1, in combination with means to adjust the relation of the quantity of filtrate forced forward through the filter medium per cycle, to the quantity of filtrate forced back through the filter medium per cycle.

9. A filter according to claim 1, in which the pump means includes two pump elements whose displacement per unit of movement are the same.

10. A filter according to claim 1, in which the pump means includes a cylinder having a bore of small diameter comprising the filtering chamber, a bore of larger diameter comprising the backwash chamber, and pistons fitting the bores of the two diameters, and moving together with the same displacements in the two chambers.

11. A filter according to claim 10, in which the space between the two cylinders is connected to the atmosphere.

12. A filter according to claim 1, in which the filter medium is supported by ribs on either side.

13. A filter according to claim 1, in which the filter medium is supported by ribs on either side and the ribs are prestressed to exert a load on the filter medium which resists the pressure.

14. A filter according to claim 1, in which ribs are provided extending on both sides of the filter medium, and the inlet connection is in the form of multiple openings extending longitudinally of the ribs.

15. A filter according to claim 1, in which tubular ribs are provided supporting the filter medium on the inlet side, the inlet connection is through the openings in the ribs, and the ribs have ports near the filter medium.

16. A filter according to claim 1, in combination with means for advancing the pump means to constrict the filtering chamber and increase the size of the backwash chamber while maintaining the inlet valve and the outlet valve closed, and allowing flow through a passage from the filtrate chamber to the backwash chamber to force filtrate through the filtering medium and into the backwash chamber, means for retracting the pump means to decrease the size of the backwash chamber and enlarge the filtering chamber while maintaining the inlet valve and the outlet valve closed and allowing flow through a passage from the backwash chamber to the filtrate chamber and thus forcing a portion of the filtrate back through the filter medium and then, while the pump means is still increasing the size of the filtering chamber and constricting the size of the backwash chamber for closing off the valve means between the backwash chamber and the filtrate chamber, thereby stopping backwash, and opening the inlet valve and the outlet valve to discharge filtrate to the outlet and bring in new charge to be filtered.

References Cited in the file of this patent
UNITED STATES PATENTS

| | | |
|---|---|---|
| 582,399 | Stifel | May 11, 1897 |
| 2,338,417 | Forrest et al. | Jan. 4, 1944 |
| 2,423,172 | Booth | July 1, 1947 |